United States Patent [19]
Blocker

[11] 3,947,942
[45] Apr. 6, 1976

[54] SEAL FOR LP GAS CYLINDER VALVE AND METHOD AND TOOL FOR INSTALLATION OF SAME

[76] Inventor: William C. Blocker, 1406 N. Butler Ave., Indianapolis, Ind. 46218

[22] Filed: Feb. 12, 1975

[21] Appl. No.: 549,336

Related U.S. Application Data
[62] Division of Ser. No. 478,049, June 10, 1974.

[52] U.S. Cl............ 29/157.1 R; 29/401 C; 29/427; 29/428; 137/15
[51] Int. Cl.² ........................................ B23P 15/00
[58] Field of Search....... 29/157.1 R, 401, 427, 428; 285/332.2, 332.3; 137/15, 454.5

[56] References Cited
UNITED STATES PATENTS

| | | | |
|---|---|---|---|
| 966,870 | 8/1910 | Stoddard | 285/332.3 |
| 2,966,083 | 12/1960 | Cheney | 81/90 B |
| 3,467,413 | 9/1969 | Madrelle | 285/332.2 |
| 3,479,068 | 11/1969 | Brittain | 285/332.3 |
| 3,615,109 | 10/1971 | Brinda et al. | 285/332.2 |
| 3,755,876 | 9/1973 | Beasley | 29/401 |

FOREIGN PATENTS OR APPLICATIONS

| | | | |
|---|---|---|---|
| 639,497 | 4/1962 | Canada | 81/125 |
| 716,364 | 10/1931 | France | 81/121 B |

Primary Examiner—C. W. Lanham
Assistant Examiner—Dan C. Crane
Attorney, Agent, or Firm—Woodard, Weikart, Emhardt & Naughton

[57] ABSTRACT

An O-ring seal for installation in an LP gas cylinder valve with a method and tool for installing the seal in the valve. The LP gas valve includes an outlet passage opening into a chamber within the main body of the valve which in turn is connected to a passage which opens into a cylinder tank. The outlet passage threadedly receives a hollow cylinder through which a stem projects. The stem includes an enlarged bullet shaped end projecting through an annular seat within the outlet passage and into a tapered portion of the outlet passage. An O-ring seal is installed on the annular seat effecting a seal between the valve and stem while spacing the enlarged bullet shaped end of the stem from the tapered portion of the outlet passage. A plate wrench has a hexagonally shaped hole through which a hexagonally shaped nut on the hollow cylinder projects. The wrench is used to tighten the stem with respect to the O-ring seal. Means are provided on the plate wrench for storing spare O-ring seals.

3 Claims, 8 Drawing Figures

SEAL FOR LP GAS CYLINDER VALVE AND METHOD AND TOOL FOR INSTALLATION OF SAME

This is a division of application Ser. No. 478,049 filed June 10, 1974.

BACKGROUND OF THE INVENTION

1. Field of the Invention

This invention is in the field of LP cylinder valves and more specifically, methods and tools for effecting a seal between the valve and a stem connected to the outlet of a valve.

2. Description of the Prior Art

A standard valve has been adopted in the LP gas cylinder industry for controlling the flow of LP gas from the cylinder tank. The valve, commonly referred to as a POL fitting, has a bottom threaded portion which is mounted into the LP cylinder tank. The valve also includes an internally threaded outlet with means provided within the valve body to control the flow of LP gas from the tank and through the chamber to the outlet of the valve. In addition, a safety mechanism is provided on the valve to allow escape of LP gas in the event that the pressure within the tank exceeds a predetermined value.

The outlet of the valve includes an internally threaded tube having an inner tapered portion opening into a chamber within the valve body. The outlet of the valve is connected to an external pipe by means of a hollow stem having an inner enlarged bullet shaped end forced into contact with the tapered inner portion of the outlet. The metal contact therefore provides a seal between the outlet and stem. Such a stem is referred to commonly as a hard nosed male connector. Such connectors cost approximately 85 cents per unit. An alternate version is identical with the hard nosed male connector with the exception that an O-ring is mounted to a groove provided in the enlarged bullet shaped end of the stem thereby preventing metal to metal contact between the bullet shaped end and the outlet with the O-ring being forced between and against the enlarged bullet shaped end and the tapered portion of the outlet. The O-ring is positioned within the tapered portion. Such a connector is commonly referred to as a soft nosed male connector and may be purchased for approximately $5.00 per unit.

The soft nosed male connector is advantageous in that the connector may be repetitively connected and disconnected from the LP gas valve without damage or marring resulting from the metal to metal contact between the enlarged end of the stem and the tapered portion of the valve. A disadvantage of the soft nosed connector is the relative higher cost as compared to the hard nosed male. The soft nosed connector is also advantageous over the hard nosed connector since less torque is required to effect the seal with the O-ring version thereby alleviating the necessity for large wrenches for installing the soft nosed connector.

As a result of the lower cost of the hard nosed connector, most connectors in use are of the hard nosed variety. Disclosed herein is a seal and method for converting a hard nosed connector into a soft nosed connector by inserting an O-ring between the enlarged bullet shaped end of the stem and the tapered portion of the outlet of the valve thereby preventing the metal to metal contact even though a seal is achieved. Also disclosed is a wrench for tightening the connector which includes means for storing spare O-rings within the wrench.

SUMMARY OF THE INVENTION

One embodiment of the present invention is in a liquid petroleum valve and tank combination including a tank for holding liquid petroleum with the tank having an outlet aperture, the combination further including a liquid petroleum valve threadedly received by the outlet aperture, the valve having a main body with a chamber formed therein and an inlet passage leading from the outlet aperture to the chamber, the main body further including an internally threaded outlet tube with an outlet passage extending therethrough opening into the chamber with the valve including means mounted to the main body operable to control flow of liquid petroleum from the tank through the chamber and the outlet passage, the outlet passage including an inner tapered portion and an outer internally threaded portion with an annular seat disposed therebetween the valve having an externally threaded hollow cylinder threadedly received by the internally threaded portion and a hollow stem slidably extending through the hollow cylinder, the stem includes a bullet shaped enlarged head projecting through the annular seat into the inner tapered portion being secured therein by the hollow cylinder wherein the improvement comprises an O-ring seal seated on the annular seat with the enlarged head forced through and against the O-ring seal effecting a fluid tight seal between the enlarged head and the main body by the hollow cylinder forcing the enlarged head against the O-ring seal with the enlarged head being spaced from the inner tapered portion.

Another embodiment of the present invention is an O-ring seal storage wrench comprising a plate having a first hole extending therethrough for complementarily receiving a nut to be tightened, the plate having means thereon operable to releasably hold at least one O-ring seal.

Yet another embodiment of the present invention is a method of changing a hard nosed liquid petroleum cylinder valve to a soft nosed liquid petroleum cylinder valve comprising the steps of untightening and removing a male hollow valve stem having an enlarged nose end from a liquid petroleum cylinder valve, the valve having an internal tapered portion and an annular seat, inserting an O-ring seal into the valve and onto the annular seat through which the stem projects, mounting the stem onto the valve, extending the stem through the seat and ring, keeping the enlarged nose end spaced apart from but adjacent to the tapered portion, and tightening the stem on the body forcing the enlarged nose end against the O-ring seal effecting a seal between the stem and the valve.

It is an object of the present invention to provide an improved LP valve cylinder combination having an improved seal between the valve outlet and a tube connected thereto.

A further object of the present invention is to provide a tool for storing spare O-ring seals and for use in tightening a tube to the outlet of an LP gas valve.

Another object of the present invention is to provide a method of changing a hard nosed LP cylinder valve to a soft nosed LP cylinder valve.

Related objects and advantages of the present invention will be apparent from the following description.

DESCRIPTION OF THE PREFERRED EMBODIMENTS

Figure 1:
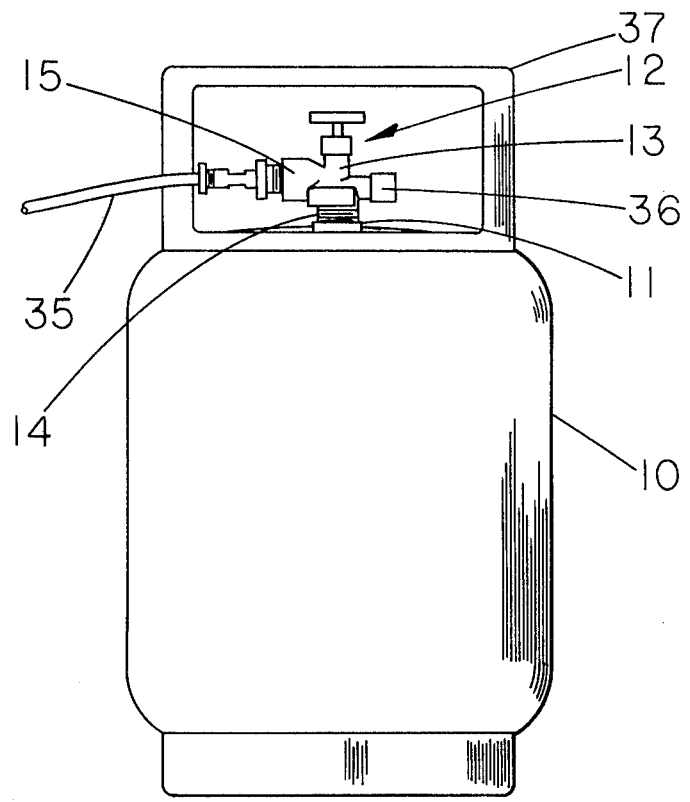
FIG. 1 is a side view of an LP gas valve and cylinder combination incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 4:
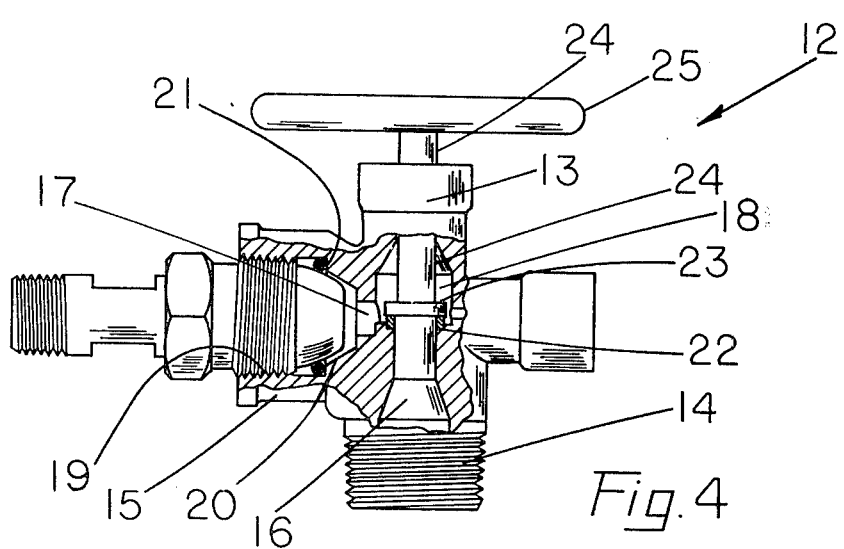
FIG. 4 is an enlarged fragmentary side view of the LP gas valve of FIG. 3.

Referring now more particularly to FIG. 1, there is shown the combination of a liquid petroleum gas cylinder 10 having an outlet aperture 11 threadedly receiving liquid petroleum gas valve 12. Valve 12 has a main body 13 with an inlet 14 and an outlet 15. Main body 13 has a chamber 18 (FIG. 4) which opens into the inlet passage 16 extending through inlet 14. In addition, chamber 18 opens into the outlet passage 17 extending through outlet 15. Outlet 15 is of tubular construction having an internally threaded portion 19 surrounding outlet passage 17 with the outlet passage further including a tapered portion 20 positioned between internal threads 19 and chamber 18. An annular seat 21 surrounds outlet passage 17 and is located between tapered portion 20 and internal threads 19.

An annular ring 22 is formed within the valve body and receives movable wall 23 attached to rod 24 rotatably mounted to the valve body. A handle 25 is fixedly attached to rod 24 with rotation of the handle and rod resulting in movement of wall 23 either toward or away from ring 22 thereby controlling the flow of liquid petroleum through inlet passage 16 and then through the chamber and out passage 17.

Figure 2:
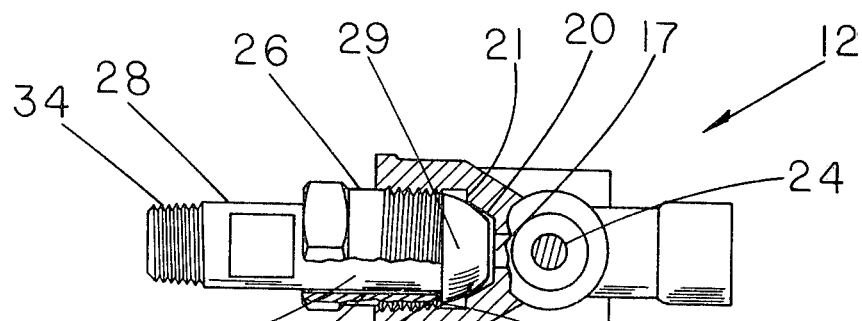
FIG. 2 is an enlarged fragmentary top view of the LP gas valve shown in FIG. 1 and having a hard nosed connector secured thereto.

An externally threaded hollow cylinder 16 (FIG. 3) is threadedly received by threads 19 and has a hexagonally shaped nut 27 integrally formed thereon. A hollow stem 28 extends through cylinder 26 with the stem including a bullet shaped enlarged head 29 projecting through annular seat 21 and into tapered portion 20 of outlet passage 17. Cylinder 26 is fragmented in FIG. 2 to illustrate the hollow interior 30 of the cylinder through which stem 28 projects. As shown in FIG. 2, the inner end 31 of cylinder 26 projects against the overhanging portion 32 of the bullet shaped enlarged head 29 thereby forcing head 29 through annular seat 21 and into tapered portion 20 as cylinder 26 is threaded into the valve body. In the prior art devices, a seal is accomplished between head 29 and tapered portion 20 by forcing the bullet shaped enlarged head 29 sufficiently into tapered portion 20 so as to achieve metal to metal contact between head 29 and portion 20. My improvement is to insert an O-ring seal 33 onto the annular seat 21 with the enlarged head 29 being forced through and against the O-ring seal 33 thereby achieving a fluid tight seal between the enlarged head 29 and tapered portion 20 of the main body of the valve. Hollow cylinder 29 may be tightened so as to force the enlarged head 29 against the O-ring 33 with the enlarged head 29 being spaced at all times away from the inner tapered portion 20 thereby preventing scratching or marring of tapered portion 20.

Figure 3:
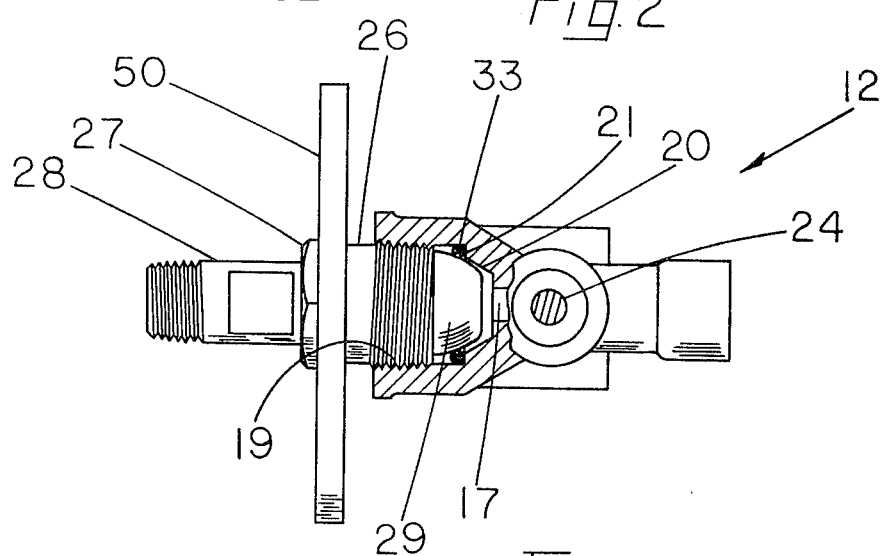
FIG. 3 is the same view as FIG. 2 only showing a soft nosed connector mounted to the valve body.

The method of changing a hard nosed liquid petroleum cylinder valve as shown in FIG. 2 to a soft nosed liquid petroleum cylinder valve as shown in FIG. 3 includes the first step of untightening and removing the male hollow valve stem 28 from valve 12. The O-ring seal 33 is then inserted into the valve onto annular seat 21 with stem 28 then being mounted to the valve with enlarged end 29 extending through the O-ring and into the tapered portion 20. End 29 of the stem is kept at all times spaced apart from tapered portion 20 even though it is adjacent to tapered portion 20. The stem is then tightened on the body by threading cylinder 26 into the body and forcing the enlarged end 29 against the O-ring seal resulting in a seal between stem 28 and valve 12.

Stem 28 is provided with external threads 34 on its outer end to threadedly receive external pipe 35 (FIG. 1) which may be rigid or flexible and which in turn may be connected to the regulator or other external device. Typically, valve 12 is provided with a safety outlet 36 in communication through the inlet passage with the interior of tank 10 thereby allowing escape of pressure when the pressure within the tank exceeds the predetermined value. A safety shield 37 is typically mounted to the top end of tank 10 partially enclosing and protecting the valve as well as auxillary equipment, such as, an indicator.

Figures 5, 6:
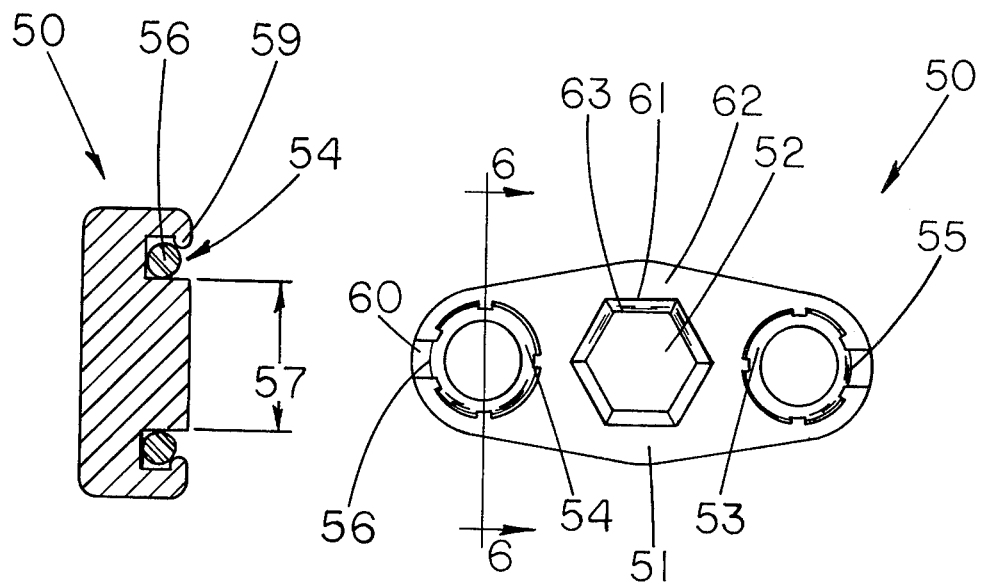
FIG. 5 is a plan view of a plate wrench incorporating the present invention.
FIG. 6 is an enlarged cross sectional view taken along the line 6—6 of FIG. 5 and viewed in the direction of the arrows.

FIGS. 5 and 6 disclose a plate wrench 50 used to tighten the hexagonally shaped nut 27 (FIG. 3) on cylinder 26. Plate wrench 50 has a main body 51 with a first hole 52 extending therethrough for complementarily receiving nut 27. In addition, the plate wrench includes a pair of grooves 53 and 54 for releasably holding O-ring seals. A pair of O-rings 55 and 56 are secured respectively within grooves 53 and 54.

Groove 54 and O-ring 56 will now be described it being understood that a similar description applies to groove 53 and O-ring 55. The average inside diameter 57 of groove 54 is greater than the inside diameter of O-ring 56 thereby requiring the flexible O-ring to stretch in order to be positioned within the groove. A plurality of projections 59 are formed within groove 54 projecting partially across the groove so as to prevent accidental disengagement of the O-ring with respect to the plate. Groove 54 opens through a recess 60 formed in the end of the plate thereby allowing a person to extend an object such as a finger, into the groove for removing the O-ring therefrom.

Hole 52 has a larger size and configuration 61 on side 62 of the plate as compared to the configuration and size 63 on the opposite side of the plate. That is, hole 52 tapers from one side of the plate to the other side of the plate thereby resulting in a frictional engagement of the wrench with respect to the nut 27 formed on hollow cylinder 26. The size of nut 27 is approximately between the size of hole 52 on side 62 and the size of hole 52 on the opposite side of the plate.

An additional step of the described method is removing the O-ring seal stored in wrench 50 prior to inserting the O-ring seal into the valve body. In addition, the stem is extended through the plate wrench prior to mounting the stem to the valve body enabling positioning of nut 27 through hole 52. The wrench is produced from plastic and is disposable and as a result, the wrench may be left on the nut after hollow cylinder 26 is tightened thereby alleviating the necessity for disengaging the regulator or other external device attached to stem 28. An advantage of producing the wrench from plastic is the prevention of sparks resulting from a metal wrench and the metal valve. Plate wrench 50 has an approximate length of 3 inches thereby limiting the amount of torque practically applied to the hollow cylinder and thereby eliminating the possibility of metal to metal contact between the enlarged end of the stem and the valve body.

Figures 7, 8:
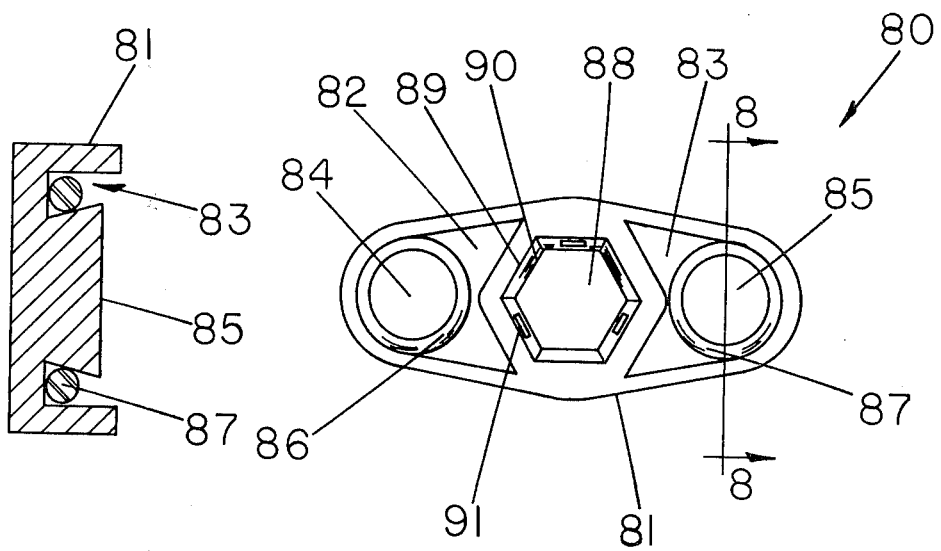
FIG. 7 is a plan view of an alternate embodiment of the plate wrench.
FIG. 8 is an enlarged cross sectional view taken along the line 8—8 of FIG. 7 and viewed in the direction of the arrows.

Plate wrench 80 is similar to wrench 50 and is an alternate embodiment thereof. Wrench 80 has a main body 81 with two recesses 82 and 83 formed on one side of the main body. A pair of upraised portions 84 and 85 are positioned respectively in recesses 82 and 83 to fittingly receive respectively O-rings 86 and 87. The diameter of upraised portions 84 and 85 are greater than the inside diameter of O-rings 86 and 87 thereby requiring the O-rings to be stretched in order to be fitted onto the upraised portion. Recesses 82 and 83, in conjunction with upraised portions 84 and 85, thereby form a pair of grooves which receive the O-rings with one of the grooves shown in FIG. 8. The diameters of upraised portions 84 and 85, as shown in FIG. 8, thereby retaining the O-rings without requiring projections 59 such as are utilized with wrench 50.

The hexagonally shaped hole 88 extending through main body 81 has a larger size and configuration on one side of main body 81 than on the opposite side in a manner similar as that described for hole 52. That is, hole 88 has a smaller size 90 on one side of the wrench as compared to size 89. In addition, a plurality of projections 91 are provided on the plate projecting into hole 88 being positioned between the opposite sizes 89 and 90 to provide additional frictional engagement of the wrench with respect to the valve nut 27.

It will be obvious from the above description that the O-ring requires only simple installation procedures which may be accomplished in the field. The method and tool is relatively inexpensive thereby allowing the conversion of an inexpensive hard nosed connector into a soft nosed connector for an LP gas valve. The O-rings are coated with silicon thereby providing for a better seal between the enlarged end and the valve body. The relatively small sized wrenches 50 and 80 are particularly advantageous when removing the hollow cylinder from the valve mounted in a confined small space. In many instances, it is impossible to remove the hollow cylinder with a large wrench due to the working space available.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A method of changing a hard nosed cylinder valve to a soft nosed cylinder valve with storage seals comprising the steps of:

storing O-ring seals in a plate wrench;

untightening and removing a male hollow valve stem having an enlarged nose end from a cylinder valve, said valve having an internal tapered portion and an annular seat;

removing an O-ring seal from said plate wrench;

inserting said O-ring seal into said valve and onto said annular seat through which said stem projects;

extending said stem through said plate wrench;

mounting said stem onto said valve;

extending said stem through said seat and said O-ring;

keeping said enlarged nose end spaced apart from but adjacent to said tapered portion;

turning said plate wrench to tighten said stem on said body forcing said enlarged nose end against said O-ring seal effecting a seal between said stem and said valve;

keeping said wrench on said stem subsequent to said turning step; and, maintaining at least one O-ring in said wrench for replacement of said O-ring seal on said annular seat.

2. The method of claim 1 wherein:

said maintaining step includes the step of stretching said O-ring to secure said O-ring in said plate wrench;

said removing step includes the step of inserting a foreign object between said O-ring seal and said plate wrench.

3. The method of claim 1 comprising the additional step of:

limiting the length of said plate wrench to limit the amount of torque applied to said stem during said turning step.

* * * * *

UNITED STATES PATENT AND TRADEMARK OFFICE
CERTIFICATE OF CORRECTION

PATENT NO. : 3,947,942
DATED : April 6, 1976
INVENTOR(S) : William C. Blocker

It is certified that error appears in the above–identified patent and that said Letters Patent are hereby corrected as shown below:

In column 3, line 59, after the word "cylinder" and before "(FIG. 3)" please change "16" to --26--.

Signed and Sealed this

*twenty-second* Day of *June 1976*

[SEAL]

Attest:

RUTH C. MASON
*Attesting Officer*

C. MARSHALL DANN
*Commissioner of Patents and Trademarks*